United States Patent [19]
Edwards et al.

[11] 3,768,747
[45] Oct. 30, 1973

[54] CARTRIDGE TAKEUP CORE AND CORE-MOUNTING SYSTEM

[75] Inventors: Evan A. Edwards, Pittsford; Robert C. Sutliff; Archie J. Tucker, both of Rochester, all of N.Y.

[73] Assignee: Eastman Kodak Company, Rochester, N.Y.

[22] Filed: Mar. 15, 1972

[21] Appl. No.: 234,794

[52] U.S. Cl. .......................... 242/71.2, 95/31 CA
[51] Int. Cl. .......................................... G03b 23/04
[58] Field of Search ................. 242/71.2, 71.1, 71, 242/197; 95/31 CA

[56] References Cited
UNITED STATES PATENTS 3,159,357  12/1964  Berlings ........................ 242/71.1
3,633,842  1/1972   Rissberger ..................... 242/71.1
3,650,489  3/1972   Bresson ......................... 242/71.2

*Primary Examiner*—George F. Mautz
*Assistant Examiner*—Edward J. McCarthy
*Attorney*—William T. French et al.

[57] ABSTRACT

An improved gear-driven molded takeup core and mounting means therefor for use in a double-chambered film cartridge is disclosed. The instant invention is characterized by a takeup core design which allows the molding of a core having improved dimensional tolerances and, in addition, facilitates a core mounting arrangement which provides improved core support not only when the cartridge is disassembled during cartridge spooling operations, but also during use of the cartridge in a camera.

5 Claims, 4 Drawing Figures

PATENTED OCT 30 1973

3,768,747

CARTRIDGE TAKEUP CORE AND CORE-MOUNTING SYSTEM

BACKGROUND OF THE INVENTION

1. Field of the Invention

The instant invention relates to double-chambered film cartridges and, in particular, to an improved cartridge takeup core and means for mounting such core in a cartridge takeup chamber.

2. Description Relative to the Prior Art

In the film cartridge art and, in particular, in that branch of the art which relates to film cartridges having spaced-apart film supply and takeup chambers, a number of arrangements are in use for rotatably mounting a takeup core within the cartridge takeup chamber. For example, U.S. Pat. No. 3,260,182 discloses a core-mounting arrangement wherein grooves flanges at opposite ends of the takeup core are rotatably supported within circular openings in respective opposed end walls of the cartridge.

Such a mounting arrangement may not, however, be suitable for use with all types of cartridges. A different arrangement is required when the aforementioned opposed cartridge end walls are not part of a common structural member (as in the above example) but are, instead, defined by discrete cartridge members. Such cartridge members must be separated to permit insertion of a roll of film into the cartridge supply chamber during spooling operations and, while separated, the members are incapable of simultaneously supporting the respective ends of the core so that an end of a photosensitive web may be attached to the core. In such case, a core-mounting arrangement may advantageously comprise an elongated spindle connected to only one of the cartridge side walls; a hollow takeup core may than be dropped onto the spindle and supported thereon during spooling even though the cartridge is disassembled. In addition, supporting the core in this manner facilitates a core-mounting system whereby the core is free to tilt with respect to the spindle. Such tilting obviates the need for end flanges on the core as a means of aligning successive web convolutions wound around the core during use of the cartridge in a camera as disclosed in copending application Ser. No. 25,958 filed on Apr. 6, 1970 in the name of Evan A. Edwards.

It has been found, however, that during the above-mentioned use of the cartridge in a camera, sufficient radially directed force may be exerted against the end of the takeup core to cause the spindle to flex and in turn produce misalignment and binding of the takeup core within the cartridge chamber.

It has also been found that the prior art "spindle support" arrangements necessitate the use of a core having a cross-section which varies considerably in thickness, and such variations present a substantial manufacturing problem in molding the core. In this regard, the peripheral areas of the thicker core portions have a tendency to shrink upon cooling in the mold, but are restricted from doing so because they are in contact with the walls of the mold. The central portions, however, are free to shrink and, in so doing, produce a surface which is sunken with respect to the peripheral areas. The end product may, therefore, have external dimensions which are not within acceptable tolerances.

SUMMARY OF THE INVENTION

It is an object of this invention to provide an improved spindle-type core support arrangement whereby the core is not only held in place on the spindle when the cartridge is disassembled for spooling, but whereby the core is so sufficiently supported within the cartridge as to prevent core binding during use of the cartridge in a camera.

It is thus an object of the invention to provide a core design which is cooperable with the improved core support system and which facilitates the molding of a core having improved dimensional tolerances.

In accordance with the subject invention there is provided a core mounting spindle carried by one sidewall of the cartridge takeup chamber. The spindle has a distal end that telescopically receives, and is in turn similarly received by, a cartridge takeup core so as to lend support to the core during spooling operations. The core itself telescopes with a core support pin carried by the opposite sidewall so as to provide improved core support during use of the cartridge in a camera. Such telescoping core design further provides, in cooperation with an annular light lock pocket, a core having a cross-sectional configuration of substantially uniform thickness so as to facilitate the core molding process.

DESCRIPTION OF THE PREFERRED EMBODIMENT

Figure 1:
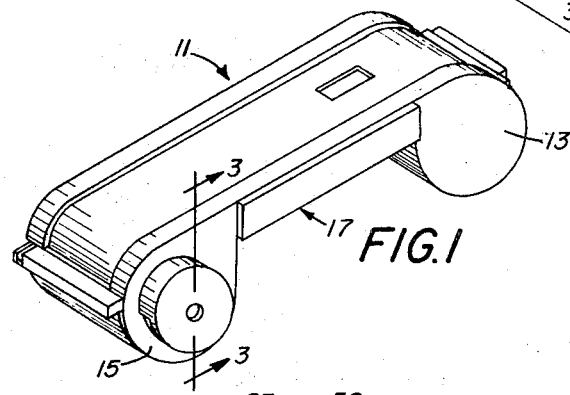
FIG. 1 depicts an assembled cartridge embodying the subject invention.

FIG. 1 depicts an assembled film cartridge 11 having a generally cylindrical supply compartment 13 spaced from and interconnected with a generally cylindrical takeup compartment 15. In use, a photographic web comprised of a photosensitive film strip either along or in combination with a light-impervious backing material strip is removed from the supply compartment 13, transported past an exposure area 17, and re-wound within the takeup compartment 15.

Figure 2:
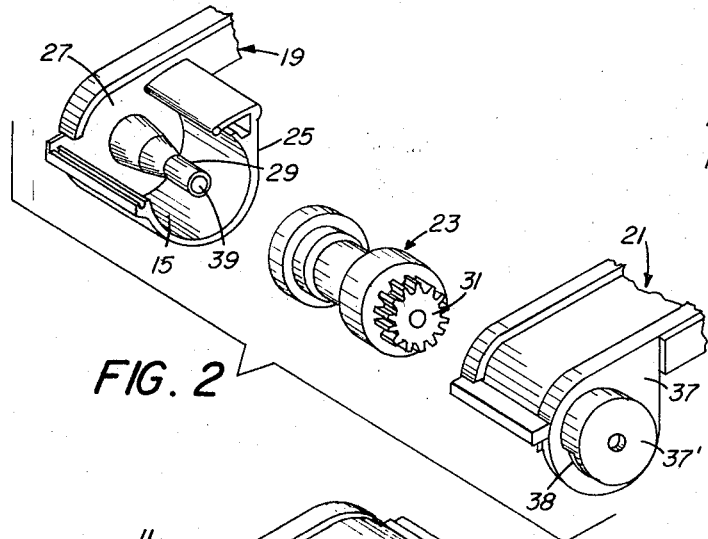
FIG. 2 is an exploded view of the cartridge shown in FIG. 1.

Cartridge 11 comprises three discrete structural members as shown in FIG. 2: a cartridge body 19, a cartridge cover 21, and a takeup core 23. Body 19 defines a generally cylindrical takeup compartment peripheral wall 25 and a generally planar first end wall 27 which is attached to wall 25 so as to enclose one end of the takeup compartment 15. A core support spindle 29 has a generally conical configuration to facilitate extraction of the spindle from a mold. Spindle 29 also has a distal end 39 and is attached at its opposite, or base, end to end wall 27. Spindle 29 extends from wall 27 toward the opposite end of compartment 15 in generally coaxial alignment with the central axis of compartment 15.

Figure 3:
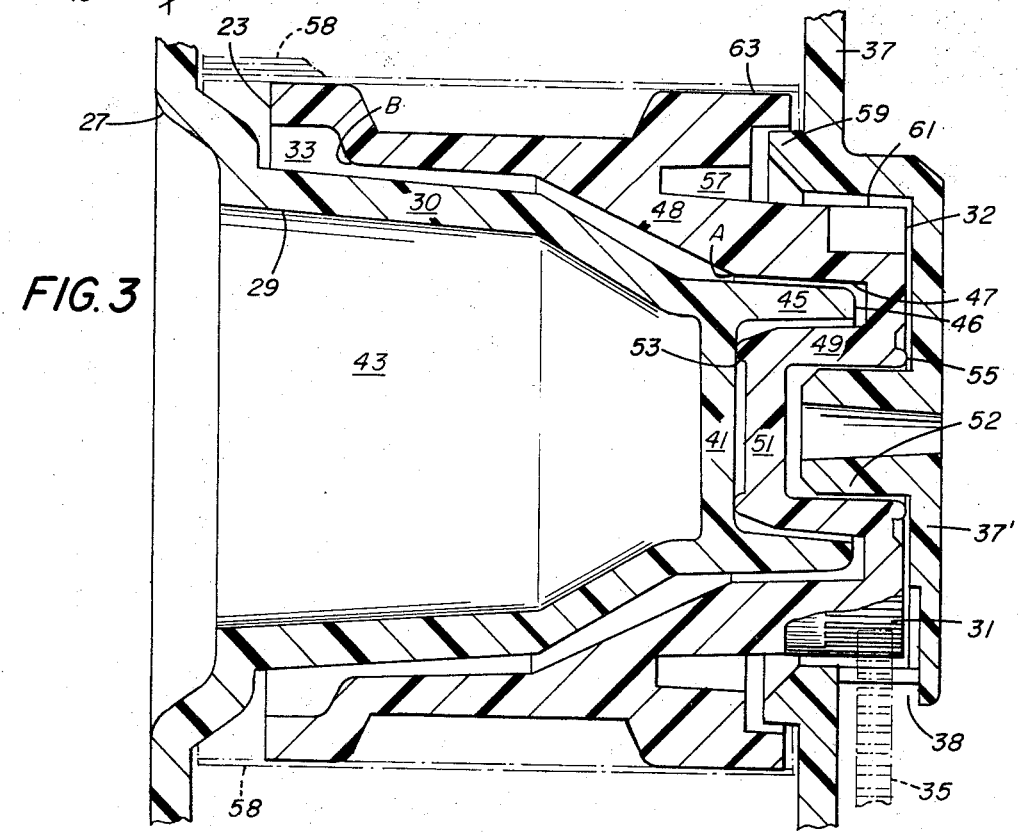
FIG. 3 is a partial cross-sectional view taken along line 3—3 of FIG. 1.

Takeup core 23 includes a core gear 31 and an exterior wall 48 defining conical central recess 33 (see FIG. 3) within which recess the spindle 29 can be received so that the core may be rotatably driven with respect to spindle 29 by a drive gear 35 (FIG. 3) carried by a camera. The opposite, or second, end wall 37 of the takeup chamber 15 is formed by the cartridge cover 21 and includes a raised gear cover portion 37' for receiving the core gear 31. An access opening 38 formed in gear cover wall portion 37' permits the camera drive gear 35 to enter into driving engagement with core gear 31. In an assembled cartridge the second end wall 37 generally opposes the first end wall 27 with the peripheral wall 25 extending therebetween; and the spindle 29 is disposed with its distal, or smaller end, closer to (but out of contact with) the second end wall 37 than to the first end wall 27, as shown in FIG. 3.

In accordance with a presently preferred embodiment of the invention, the distal spindle end 39 is designed to receive, and be in turn received by, cartridge core 23 in a telescoping arrangement. The spindle end 39 includes a radially disposed circular spindle end wall 41 generally opposing the gear cover wall portion 37'. An annular core support wall 45 completely bounds spindle end wall 41 and projects toward wall portion 37' so as to form an effective extension of a main spindle wall 30. To assist in cartridge spooling operations, support wall 45 is received within an annular well 47 formed in the end portion of core 23 and defined in part by concentric annular core wall portions 48 and 49. Well 47 is so sized with respect to the wall 45 that the wall 45, when received concentrically therewithin, (as when the cartridge is in its assembled state) will be out of contact with those surfaces of core 23 which define the well 47. Needless frictional contact between the core and the spindle is thereby reduced when the cartridge is in an assembled state. When, however, cartridge cover 21 (which carries the second compartment end wall 37) is removed, the core 23 is free (as will later be described) to drop down so that at least edge A of core wall 48 rests upon spindle wall 45. In like fashion core edge B may rest upon a portion of the main spindle wall 30. In this manner core 23 forms at least two simultaneous line contacts with spindle 29 when cover 21 is removed. Therefore, even through core 23 is not positively connected to spindle 29, but is instead slidable with respect to the spindle, the frictional contact generated at least at edges A and B tends to resist sliding and retain the core 23 on the spindle 29. The extended length of wall 45 allows considerable sliding latitude with respect to edge A, and that edge must, in fact slide past the outer edge 46 of wall 45 in order for core support to be lost.

Annular wall 49 and a radially disposed circular wall 51, together define a core bearing cup which is receivable within spindle wall 45. A generally cylindrical core bearing pin 52 carried by wall portion 37' is itself closely received within the bearing cup when the cartridge is assembled. The cylindrical outer surface of the pin 52 serves as a bearing to maintain drive gear 31 in concentric relation with gear cover 37' so as to prevent the core from binding within the takeup compartment and, in particular, to prevent the gear teeth from rubbing against the internal surface of cover 37' when the cartridge is in use in a camera.

To further reduce frictional contact with core 23 and yet provide improved core support, annular wall 49 includes, at one end, a first thrust bearing 53 in the form of an annular raised ridge disposed to form substantially a line contact with spindle end wall 41. A similar arrangement is provided at the opposite end of wall 49 in the form of a second thrust bearing 55 defined by an annular ridge which extends slightly outward from the outer face 32 of gear 31 so as to form substantially a line contact with gear cover portion 37'. In this manner any end thrust forces developed during, for example, use of the cartridge in a camera are absorbed with minimum frictional core contact so as to allow the core to rotate freely and maintain winding torque within acceptable tolerances.

To guard against fogging of the portion of photosensitive web 58 which is wound around core 23 a relatively deep annular pocket 57 is formed in takeup core 23 in concentric radially spaced relation with well 47. In an assembled cartridge, a bevelled light lock ridge 59 carried by wall 37 generally opposes pocket 57 to form, in combination therewith a labrinthine light lock. In this manner light which may, for example, enter through gear access opening 38 is not only forced to follow a tortuous path around ridge 59, but is also effectively "absorbed" within the deep confines of recess 57 and is prevented from reaching the web 58.

Figure 4:
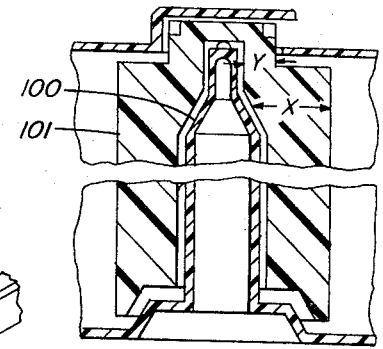
FIG. 4 depicts, in a cross-sectional view similar to FIG. 3, a spindle-type core support arrangement known in the prior art.

In addition to providing the aforementioned desirable telescoped core mounting arrangement, the design of core 23 facilitates core molding operations by avoiding excessively thickened core wall areas. In this respect, the prior art cartridge design depicted in FIG. 4, even through it does employ a spindle 100 to support a cone 101, exhibits a substantial variation in radial core thickness throughout. Note, for example, the disparity in radial core thickness as measured along radial line X with regard to that measured along line Y.

In comparison, the instant invention has a substantially uniform wall thickness (compare, for example, the thickness of walls 48 and 49). Such uniformity is provided, first of all, by the positioning of annular well 47 approximately midway between the central axis of the core 23 and the outer periphery 61 of gear 31, also, pocket 57 is similarly approximately equidistant radially from well 47 and the peripheral core surface 63. In this manner, well 47 and pocket 57 serve not only to provide respectively, improved core support and protection from fogging, but also serve to define core walls of relatively uniform thickness.

The invention has been described in detail with particular reference to preferred embodiments thereof, but it will be understood that variations and modifications can be effected within the spirit and scope of the invention.

We claim:

1. In a film cartridge (11) of the type comprising a cartridge body (19) member and a cartridge cover member (21), said cartridge including a generally cylindrical takeup compartment (15) for receiving and storing exposed photosensitive filmstrip (58), said takeup compartment comprising:

a first end wall (27) defined by said body member;

a second end wall (37, 37') defined by said cover member and generally opposing, in spaced relationship, said first end wall;

a generally cylindrical peripheral wall (25) defined by said body member and interconnecting said first and second end walls;

a generally conical spindle (29) having a base end attached to said first end wall (27), said spindle extending toward said second wall (37, 37') and terminating at a distal portion (39) spaced closer to said second end wall than to said first end wall; and a rotatable takeup core (23) housed within said takeup compartment for winding thereabout said exposed filmstrip, said core having a central recess (33) extending from an open core end adjacent said first end wall (27), to a closed core end adjacent said second end wall (37, 37') said recess being sized to receive therein said spindle (29), and said closed core end defining core mounting means for engaging said distal end (39) of said spindle, the improvement wherein:

said distal end of said spindle includes a spindle end wall (41) generally opposing said second cartridge end wall (37, 37') and an annular core support wall (45) bounding said spindle end wall and extending therefrom towards said second cartridge end wall;

said second cartridge end wall includes a core bearing pin (52) extending toward said spindle end wall (41) and centered therewith; and said core mounting means comprises:
  means for defining an annular well (47) for receiving said annular core support wall (45);
  first thrust bearing means (53) for forming substantially a line contact with said spindle end wall (41);
  second thrust bearing means (55) for forming substantially a line contact with said second cartridge end wall (37'); and
  bearing cup means (49, 51) for receiving said core bearing pin.

2. The invention of claim 1 wherein said takeup core further includes an annular pocket (57) disposed radially outward from and concentrically with respect to said annular well (47).

3. The invention of claim 2 wherein said second cartridge end wall includes means (59) for forming, in combination with said annular recess, a labrinthine light lock.

4. The invention of claim 3 wherein said core is molded from a material having a tendency to shrink upon cooling, and said core has a relatively uniform cross-sectional thickness throughout.

5. The invention of claim 4 wherein said spindle (29) includes a central recess (43) formed therein and extending from said first cartridge end wall (27) to said spindle end wall (41).

* * * * *